C. J. HEALY.
VARNISH FILTER.
APPLICATION FILED OCT. 29, 1910.

1,000,405.

Patented Aug. 15, 1911.
2 SHEETS—SHEET 2.

Witnesses:
John Herr
E. P. La Gay

Christopher J. Healy Inventor
By his Attorney
Ivan E. A. Konigsberg

UNITED STATES PATENT OFFICE.

CHRISTOPHER J. HEALY, OF BROOKLYN, NEW YORK.

VARNISH-FILTER.

1,000,405.  Specification of Letters Patent.  Patented Aug. 15, 1911.

Application filed October 29, 1910.  Serial No. 589,661.

*To all whom it may concern:*

Be it known that I, CHRISTOPHER J. HEALY, a citizen of the United States of America, and a resident of Brooklyn, Kings county, New York, have invented certain new and useful Improvements in Varnish-Filters, of which the following is a specification.

This invention relates to filters and has particular reference to filters for filtering varnishes and similar liquids which require special care in their preparation for the market.

It is the object of this invention to provide a filter adapted to filter varnish rapidly and thoroughly; to provide a portable apparatus adapted to be operated with but very little attention and one which requires no special space, but which may be placed most anywhere in the factory and to construct the filter of but few parts so as to make the cleaning of it a work of but a few minutes.

Other objects will appear as this specification proceeds.

To this end the invention comprises such combinations and arrangements of parts as is hereinafter set forth in detail while reference is had to the accompanying drawings in which—

Figure 1:
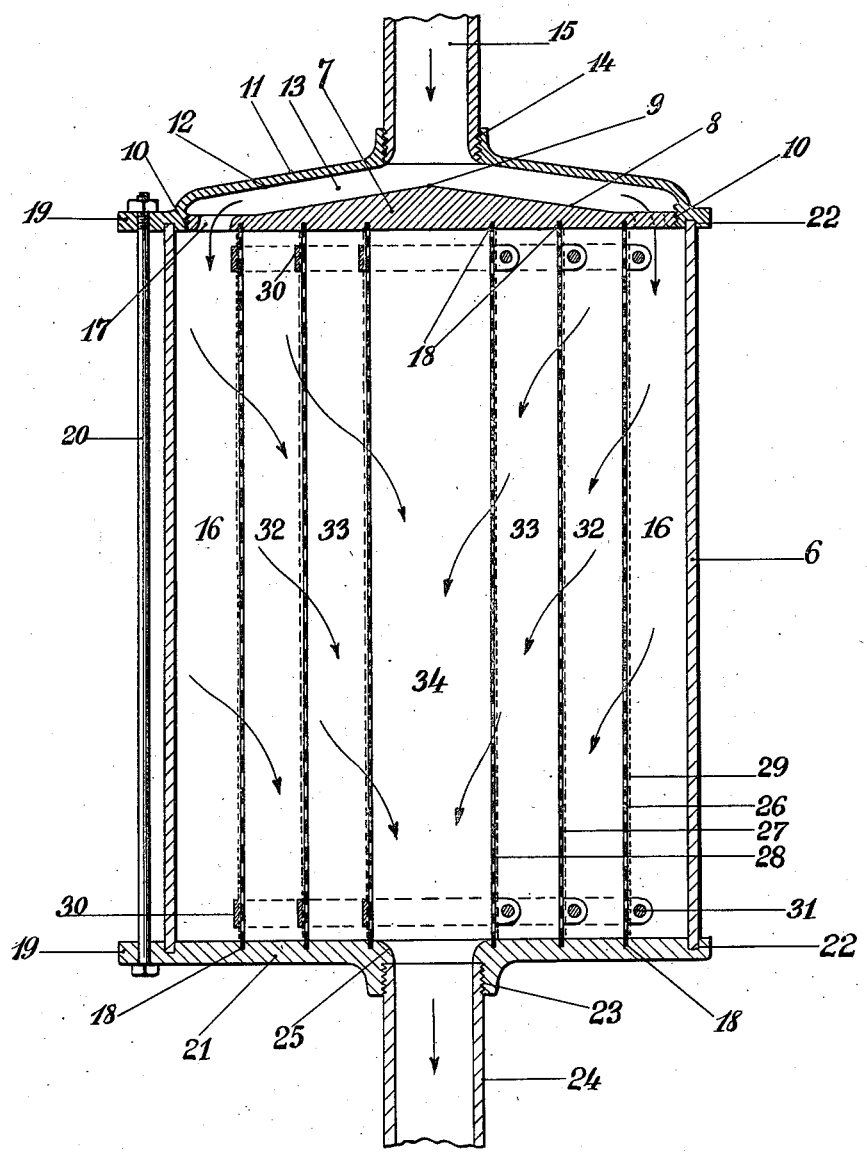
Figure 2:
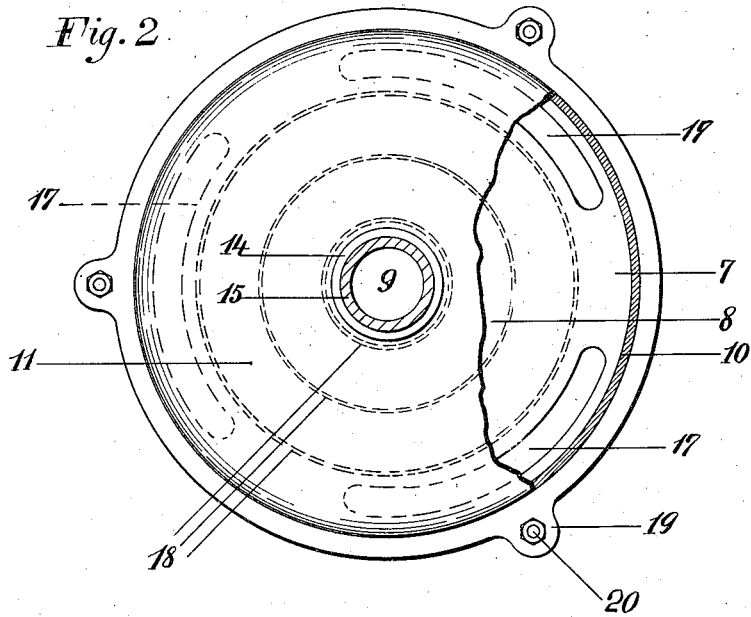
Figure 3:
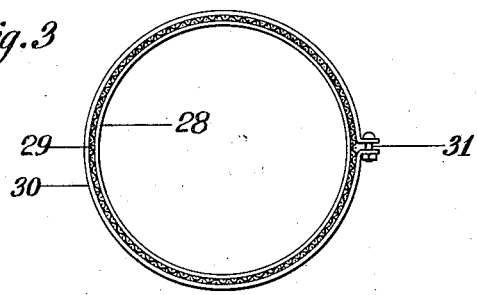
Figure 5:
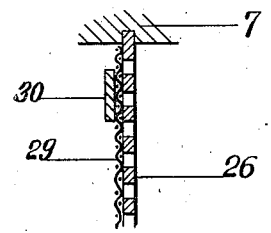
Figure 4:
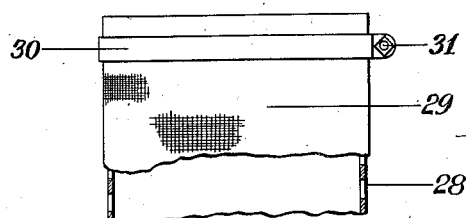

Figure 1 is a central vertical section of a filter embodying my invention. Fig. 2 is a top plan view partly in section. Fig. 3 is a plan view of one of the filtering cylinders. Fig. 4 is a fragmentary elevation of a filter cylinder, and Fig. 5 is a detail view of the wall of a filter cylinder.

In the drawings the reference numeral 6 represents a cylindrical casing within which the filter cylinders are supported.

7 denotes the inner top provided with the upper cone shaped surface 8 having its highest point 9 in the center and which is in threaded engagement as at 10 with the outer top 11 which is provided with the inner cone shaped surface 12 whereby a cone shaped chamber 13 is formed between the members 7 and 11. The outer top 11 is provided with a threaded inlet 14 into which is screwed the inlet pipe 15. The chamber 13 communicates with the filter chamber 16 through the segment shaped openings 17.

The top 7 is provided with a number of concentric grooves 18, 18 and the top 11 carries three lugs 19, 19 through which pass the bolts 20 which connect the top with the bottom 21. The contour of the latter is preferably similar to the contour of the top as shown in Fig. 2. The bolts 20 also pass through lugs 19 on the bottom.

The outer casing 6 is held in position between the top and bottom by the annular grooves 22, 22 in each of these members, and the bottom is also provided with a number of concentric grooves 18 corresponding to those in the top 7.

23 is a threaded outlet in the bottom and 24 the outlet pipe. The edges at 25 are preferably rounded as shown.

In the grooves 18 are held the perforated filter cylinders 26, 27 and 28. Around each of these there is wrapped a filter cloth 29 held in position by an upper and a lower clamping ring 30 adapted to be tightened by the bolt 31. For large detail views of these parts see Figs. 3, 4 and 5. The cloth or fabric 29 may be of any suitable material found useful for the purpose.

In operation the filter may be inserted in the piping through which the varnish flows at any suitable point. It will here be observed that this filter requires no special place or appliances for installing it, but it may be connected to the piping in the same manner as an ordinary valve. Also it will be noted that it is distinctly a portable filter and that it requires no attention during its operation, except periodical cleaning. The unfiltered varnish enters the filter by gravity through the inlet pipe 15, falls on the cone shaped surface 8 and flows gently down the latter to the filter chamber 16. I have found that the cone shaped surface is useful in that thereby the accumulation of solid matter directly under the inlet is prevented. A varnish contains much solid matter before it is filtered and if the surface 8 was flat the solids would accumulate at the inlet and clog the same or perhaps in time fill the entire chamber 13. The sloping surface 8 prevents this from happening and enables the varnish to flow in all directions downward toward the openings 17 carrying all solid matter along with it. The varnish fills the chamber 16 and begins immediately to pass through the filter cylinder 26, while the grosser solids and impurities fall to the bottom of the chamber 16. The varnish drips down on the inside of the filter 26 beginning to fill the chamber 32. From thence it passes through filter 27 to chamber 33, then through filter 28 to chamber 34 where it flows down on the inside to the outlet and leaves the filter through pipe 24. The arrows in Fig. 1 indicate the general direction of the flow. As the varnish passes through the several filters, the impurities sink to the bottom. On the bottom of the chamber 33 there will be very little or no impurities at all. It will also be observed that even if the outer chamber 16 should be, say half filled with solids, it in no wise impairs the efficiency of the filter.

It has been found by tests that this filter works rapidly and thoroughly filters the varnish. In some instances no settling of the liquid is required after it has passed through this filter, but it may pass directly into the shipping tanks. It will also be evident that the filter is very easily taken apart, cleaned, new filter cloths inserted and again assembled. Further, by reason of its simple construction it can be manufactured at very low cost, hence several filters may be used in a plant without great expense. Another very important feature is that this filter does not demand the steady service of one or more operators.

The above is thought to fully set forth and explain this invention. Changes may of course be made in the detailed construction without affecting the scope of the invention.

I claim:

A filter apparatus comprising in combination an outer top member having a central inlet and spaced fastening lugs and provided with a circular groove, an inner top member screwed into said outer member and provided with concentric grooves in its lower surface, a cone shaped chamber formed between the said members, a bottom member having spaced fastening lugs and provided with a central outlet and concentric grooves corresponding to the grooves in the aforesaid two top members, a casing adapted to be confined between the said outer top member and the said bottom member in the grooves therein, concentric filter cylinders adapted to be confined between the said inner top member and the said bottom member in the grooves therein and comprising each a perforated cylinder, filter cloths wrapped around the same and an upper and a lower clamping ring for securing the filter cloths to the said filter cylinders, concentric filter chambers formed between the said cylinders and within the said casing, passages formed in the said inner top member at the base of the said cone shaped chamber and communicating with the largest one of the said filter chambers, the smallest one of which communicates with the aforesaid outlet and bolts passing through the said lugs for securing the said casing and the said cylinders in position.

Signed at Brooklyn, N. Y. this 10th day of October 1910.

CHRISTOPHER J. HEALY.

Witnesses:
WM. J. RAFTERY,
CHARLES H. APPEL.